UNITED STATES PATENT OFFICE.

JEREMIAH B. DRAKE, OF BOLIVAR, MISSOURI.

COFFEE SURROGATE.

SPECIFICATION forming part of Letters Patent No. 543,299, dated July 23, 1895.

Application filed May 7, 1895. Serial No. 548,453. (No specimens.)

*To all whom it may concern:*

Be it known that I, JEREMIAH B. DRAKE, of Bolivar, in the county of Polk and State of Missouri, have invented a new and useful Improvement in Coffee Compounds, of which the following is a specification.

The object of my invention is to provide a compound for use in making coffee whereby a considerable economy in the use of the latter is attained without materially impairing the quality and flavor of the beverage.

In preparing my compound I take two gallons of sorghum sugar, one ounce of caffeine, one ounce cream of tartar, one-fourth ounce caffeol, and two to four ounces corn-starch. After thoroughly mixing these ingredients they are heated over a fire until they melt and become thoroughly scorched, when the composition turns brown and acquires a bitter taste. During the process of scorching or roasting the composition must be kept in constant motion by stirring to roast it thoroughly and uniformly without carbonizing or burning the same. When the roasting is complete the product is granulated by any suitable means and is placed in air-tight vessels, ready for use, or is molded into blocks.

To make coffee I use from one-quarter to two-thirds the quantity of pure roasted coffee ordinarily employed with a half-gallon of water, and to this I add from one tea-spoonful to two table-spoonfuls of my compound, which makes a rich beverage, which to the average user of coffee fully satisfies the taste for coffee, and, in fact, is superior to many examples of coffee made from the bean alone.

Having thus described my invention, what I claim as new, and desire to secure by Letters Patent, is—

The coffee compound herein described, consisting of sugar, caffeine, cream of tartar, caffeol, and corn starch, mixed and roasted in or about the proportions described.

JEREMIAH B. DRAKE.

Witnesses:
S. D. SNAPP,
A. R. SNAPP.